Figure 1:
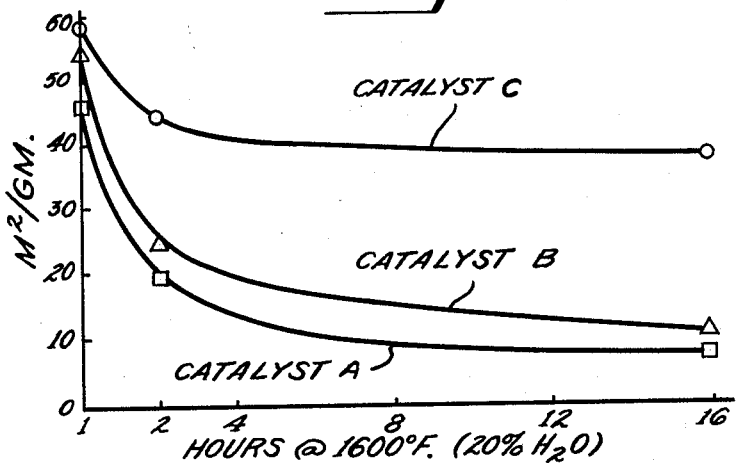

INVENTORS.
EDWARD B. CORNELIUS &
THOMAS H. MILLIKEN, JR.
BY
ATTORNEY.

United States Patent Office 2,956,030
Patented Oct. 11, 1960

2,956,030

DEHYDROGENATION CATALYST

Edward B. Cornelius, Swarthmore, and Thomas H. Milliken, Jr., Moylan, Pa., assignors to Houdry Process Corporation, Wilmington, Del., a corporation of Delaware Filed May 20, 1957, Ser. No. 660,224

2 Claims. (Cl. 252—455)

The present invention relates to improved dehydrogenation catalysts particularly useful in vapor phase processes for conversion of hydrocarbons and to enhancement of such processes by the use of these catalysts. More especially the invention is directed to improvements in such catalysts comprising chromium oxide distributed in a carrier of porous alumina and their use in dehydragenation of hydrocarbons to olefins and/or diolefins.

Processes utilizing chrome-alumina catalysts for conversion of paraffinic and olefinic hydrocarbons to produce corresponding olefins and diolefins have been described in the technical literature (see R. C. Lassiat and F. D. Parker, Petroleum Refiner, 1944, vol. 23, p. 409; C. H. Riesz et al., Oil and Gas Journal, July 15, 1944, vol. 43, pp. 67, 96; G. Hornaday, Petroleum Refiner, September 1953, p. 130; Anon., Petroleum Processing, December 1955, p. 1929), as well as in numerous patents (e.g. Houdry, U.S. 2,423,029). In the commercial processes for production of butylenes and/or butadiene extensive use has been made of catalyst prepared by impregnation of suitably heat-treated or activated alumina with chromium oxide in an amount to furnish about 20% $Cr_2O_3$ by weight of the catalyst. Such catalysts, when properly prepared, have produced acceptable yields of desired products over a reasonable life period of catalyst activity. In practice of the process by typical repeated cycles of contact with hydrocarbon and periodic regeneration by combustion of coke formed therein, these catalysts show a progressive decline in activity and/or selectivity so that in about six months, more or less, it becomes economically necessary or desirable to replace the catalyst in the system.

It is an object of the present invention to provide chrome-alumina catalysts of improved properties, such as to prolong the useful life thereof in operation and to maintain more stable activity and selectivity during the period that the catalyst remains in use.

In the typical commercial manufacture of chrome-alumina dehydrogenation catalysts, pellets of activated alumina having a surface area of about 80 square meters per gram are impregnated with chromic acid, dried and calcined. The finished chrome-alumina pellets, containing 20% $Cr_2O_3$ by weight thereof, have a surface area of about 50-60 square meters per gram.

The improved catalysts, according to the present invention, are prepared by impregnating a stabilized porous alumina of high surface area, comprising predominantly gamma type alumina, with an aqueous chromium hydroxide solution or other solution of chromium compound which can be and is converted to the oxide; the alkali metal ion content of the catalyst is controlled to lie in a well-defined range of about 0.15 to about 0.5% alkali metal oxide by weight of the catalyst.

The alumina at the time of impregnation with the chrome should have a surface area of at least 120 square meters per gram and preferably no less than about 150 square meters per gram. Alumina of such high surface area can be obtained by controlled heating of an alumina hydrate at temperatures in the range of 350 to 850° F. for sufficient time to reduce the combined $H_2O$ content to less than ⅔ mol $H_2O$/mol $Al_2O_3$ (or less than about 10% $H_2O$ by weight). While it is possible to obtain alumina of such high surface area in completely dehydrated state by exacting control of the heating, under conditions that would be normally used in practice for effecting such heating even in substantially dry air, the obtained alumina will not be completely dehydrated but will still contain in the order of about ½ to 2% by weight of combined water. Certain forms of commercially available porous alumina may have the desired surface area of above 120 and even above 150 square meters per gram.

In order to achieve the desired catalysts of superior properties, it is not enough to start out with an alumina support having initially a high surface area, but the support must be one that does not too readily or too rapidly undergo structural changes or loss of area when subjected to temperatures prevailing in the intended use of the catalyst or in its preparation for such use. The high area alumina subjected to impregnation with the chromium compound must therefore be one in which the gamma alumina type structure has been stabilized so as to inhibit thermal transition (with or without catalysis of such transition) to relatively non-porous alpha chromia-alumina, which not only differs from the gamma type in porosity, but shows a different crystal structure and evidences important differences as a catalyst. In the absence of stabilizing materials gamma alumina is readily and irreversibly transformed in substantial extent to alpha alumina at various temperatures below the fusion point of the gamma alumina. Such transistion to alpha alumina takes place to considerable extent with temperature increase even at conditions most favorable for retention of the gamma type alumina structure, and particularly so in the case of chrome-impregnated alumina. By the incorporation of certain stabilizing materials in relatively small amount into the gamma alumina, the transition temperature for any given treating environment is raised, or stated otherwise, the stabilized gamma alumina or gamma chrome-alumina is capable of withstanding more drastic treatment, including higher temperatures, without the same loss in area or extent of transition to alpha form suffered by the corresponding material without stabilizer.

The aforesaid stabilization of the gamma structure with corresponding increased resistance to loss of area, is best accomplished by inclusion in the alumina of a small amount of siliceous material in well distributed form. The preferred stabilizer is a so-called "soluble" or swelling bentonite, generally available in the form of sodium bentonite. These swelling bentonites, of which the Wyoming variety is a common example, are to be distinguished from the sub-bentonites or acid-activable montmorillonite clays which merely slake in water. Other colloidal clays as well as synthetic siliceous materials such as silica sols and gels, which are finely dispersed or peptized to colloidal size, can also be used. Such stabilizing materials, which do not form true solutions or those whose solutions are highly viscous, cannot be incorporated into the alumina for effective stabilization by dipping, spraying or other conventional impregnation techniques, but are best incorporated by wet admixture with alumina hydrate. On the other hand, solutions of silicon chloride or ethyl silicate in appropriate organic solvents and sodium silicate in highly dilute aqueous solutions can be incorporated into the alumina by dipping or spraying, but do not necessarily obtain to full extent all of the advantages demonstrated by the sodium bentonite. Other metal oxides such as those of thorium, hafnium, zirconium and the like also serve to stabilize alumina. These oxides, however, are not to be regarded as the equivalent of the siliceous stabilizers in chrome-alumina catalysts since such metal oxides may have an adverse effect on desired product distribution when such catalysts are used in dehydrogenation, whereas the siliceous stabilizers either do not affect product distribution or, as in the case of the sodium bentonites, may even improve desired product distribution, particularly from the standpoint of lowered coke make.

In general, and particularly in the case of sodium bentonite, the stabilizing materials are preferably employed in the amount of about 1 to 3% by weight of the alumina (as $Al_2O_3$). While some stabilization of the alumina is achieved with less than 1% stabilizer, as in the range of 0.5 to 1.0%, such amount has not been found sufficient to obtain the full possible advantages, while at above 3% and less markedly even in the range of 2 to 3%, the increased stability of the catalyst, if any, is overshadowed by adverse effects of the increased stabilizer content on other properties of the catalyst, particularly from the standpoint of lower unit activity of the aged catalyst.

As in the case of many known surface active catalysts the presence of alkali metal compounds, and particularly those of sodium or potassium, is generally undesirable because of their possible adverse effect on activity or selectivity of the catalyst or from the standpoint of their acting as fluxing impurities lowering the temperature of sintering or fusion of the catalyst. Notwithstanding these earlier observations it has been found, to the contrary, that the presence of alkali metal ion within certain narrow limits not only can be tolerated in the chrome-alumina catalysts of the present invention, but that within these limits the alkali metal ion has a beneficial effect. Thus, while the selectivity for butene production by dehydrogenation of butane tends to decline to greater or less extent, as might be expected, with increasing sodium content of the catalyst, contrary to expectation, it was further found that by reducing the sodium content of catalysts prepared in accordance with the present invention to below about 0.15% $Na_2O \pm 0.05\%$ (on $Cr_2O_3$—$Al_2O_3$ basis), the butene production at constant conversion level suffered a more than 10% loss in yield. Moreover, at below about 0.1% $Na_2O$ the coke make is higher than at 0.4 to 0.5% $Na_2O$ content of the catalyst, above about 0.5% $Na_2O$ the coke make again rises, more particularly evidenced as the catalyst is aged. While the effect of sodium content on the selectivity of the catalyst for butadiene production is perhaps less pronounced, the adverse effect of decreasing the sodium content below about 0.15% $Na_2O$ is nonetheless significant. From over-all considerations, taking into account the effect of sodium content on activity, selectivity and aging stability of the catalysts of the invention, the optimum $Na_2O$ content is believed to be in the range of 0.25 to 0.45% $Na_2O$.

The preferred catalysts of the invention are those having, in addition to the desirable properties hereinbefore set forth, good hardness in pelleted form. Hard alumina pellets can be prepared by the methods described in copending application Serial No. 510,868, now abandoned, which involves mixing of alumina trihydrate with nitric acid solution, controlling the water content of the mix, and extruding the obtained mix to form pellets which are dried and heat treated. Following this procedure for preparation of the superior catalysts of the present invention, sodium bentonite or other dispersible siliceous stabilizing material as described above is added in desired quantity to a mixture of the alumina trihydrate and aqueous nitric acid and the ingredients thoroughly admixed, the mixture being permitted to stand or otherwise aged to assure reaction of the nitric acid with the alumina, then the mixture is formed into pieces of desired size, for example by extrusion through die plates to strands which are cut into pellets. The obtained pellets are dried, then heat treated at temperatures and for a period sufficient to develop an attrition-resistant structure of high surface area. The pellets so obtained will have a surface area of 150 to 200 square meters per gram or more. These pellets, without adjustment of their surface area, are then impregnated with an aqueous solution of chromic oxide or a soluble chromium salt under conditions obtaining good distribution of the chromium compound, and dried, which is generally followed by a conditioning treatment in steam and air to fix the structure and initial activity of the catalyst as described, for instance, in Houdry et al. U.S. Patent No. 2,399,678. Thus, by treatment for 2 hours at 1200° F. in 20 mol percent steam the surface area of the catalyst is reduced to about 95–98 square meters per gram. By further more severe steam treatment the catalyst is brought to desired activity level with further reduction in surface. Supported chromia catalysts to which the invention applies are those containing 5 to 40% $Cr_2O_3$ by weight thereof and having a preferred $Cr_2O_3$ content of 15 to 25%.

Since many brands of alumina trihydrate and other alumina hydrates that may be employed as starting materials for preparation of catalysts of the invention are prepared by methods including treatment with alkali, many of these available hydrated aluminas will already contain greater or less amounts of alkali metal "impurity." Many commercial grades of alumina trihydrate contain in the order of about 0.35% $Na_2O$ on the trihydrate basis so that these can be employed directly in preparing chrome-alumina catalyst containing an amount of sodium in the specified range without adjustment of the sodium content. On the other hand, if the sodium content of the starting alumina hydrate is too low, the same can be adjusted by inclusion of the required additional amount of alkali metal hydroxide or alkali metal nitrate in the trihydrate-nitric acid mix or better yet by using a small amount of sodium chromate in the chromium solution used for impregnation. On the other hand, if the alkali metal content of the starting hydrated alumina is too high, the alkali metal oxide content can be readily adjusted by leaching the calcined pellets with nitric or acetic acid solution prior to chrome dipping, or by appropriate treatment of the alumina trihydrate.

While the preferred catalysts are those of high hardness prepared by the above-described nitric acid mixing technique, or other techniques obtaining attrition-resistant gamma alumina, the invention is not limited thereto. Commercial porous aluminas comprising principally gamma alumina of sufficiently high surface area in tabular or other pelleted form can be treated to incorporate the required quantity of stabilizing material, particularly siliceous stabilizers, and impregnated with chrome to obtain desirable catalysts, but these will not have the hardness and all of the beneficial properties of catalysts produced in accordance with the preferred method described.

The improved properties of catalysts of the invention are best displayed when these are used in the dehydrogenation of paraffins to olefins and/or diolefins, or in conversion of olefins to diolefins; as in the production of butylenes and butadiene; likewise generally in the dehydrogenation of other $C_3$ to $C_5$ acyclic hydrocarbons. The present catalysts, however, are not limited to such use but may be utilized generally in any of the known processes employing chrome-alumina catalyst, such as in hydroforming or in the dehydrogenation of alkyl cyclopentanes to cyclic olefins [see Heinemann: Ind. and Eng. Chem. (September 1951), vol. 43, p. 2098].

In use of the catalysts for conversion of hydrocarbons, the same operating conditions in general may be employed as in the case of previous chrome-alumina catalysts.

EXAMPLE I

The following materials were thoroughly admixed for 30 minutes in the proportions designated:

| | Parts by weight |
|---|---|
| Alumina trihydrate (0.35% $Na_2O$) | 198.7 |
| Volclay (sodium bentonite) | 1.3 |
| Nitric acid (40° Bé.) | 29.0 |
| Water | 8.0 |

The mix was permitted to age for 44 hours and extruded under pressure through a die plate having 4 mm. perforations, the strands being cut to approximately 4 mm. lengths. The obtained pellets were rapidly dried in air at 270° F. and then heat-treated in dry air for 1 hour at 800° F. The pellets, after this treatment, had a bulk density of 0.80 kg./liter, a surface area of 188 square meters per gram, and a crushing strength above 31 pounds.

A solution of $CrO_3$ of 1.469 specific gravity (at 20° C.) containing 698 grams $CrO_3$ per liter, was cooled to below 5° C. and admitted into a receiver containing the above pellets (188 m.²/g.) which had also been separated cooled to about the same temperature. The liquid was permitted to remain in contact with the pellets for one hour while keeping the system cool, then the pellets were drained and dried at 250° C. for 2 hours. The pellets contained approximately 20% $Cr_2O_3$ and about 0.45% $Na_2O$ on an ingited alumina basis.

A portion of the pellets so obtained was treated at 1200° F. for two hours in a steam-air mixture containing 5% $H_2O$. The so-treated pellets, which now had a surface area of 97 square meters per gram, were then tested in dehydrogenation of a butane charge at 1100° F., under a pressure of 5 inches Hg absolute and at an hourly space rate of 1 volume hydrocarbon per volume of catalyst, for a ten-minute on-stream cycle. There was obtained an 84% by weight conversion of the charge with the production of 41% butenes and 18% butadiene. At this high conversion level the quantity of coke formed is higher than that ordinarily desired for commercial operation. The same butane conversion operation repeated at otherwise the same operating conditions but at lower temperature (1050° F.) brought down the coke make to an acceptable level. Better product distribution is assured, however, if the high area catalyst is given an initial steam treatment of greater severity as will be seen from operations described below.

In Table 1 there is shown a comparison of the characteristics of the novel catalysts of the invention with the two principal commercial chrome-alumina catalysts employed in dehydrogenation. Catalyst A comprised about 25% $Cr_2O_3$ on alumina (as $Al_2O_3$) and contained no added stabilizer. Catalyst B had about the same $Cr_2O_3$ content and contained in addition about 0.5% sodium bentonite. Catalyst C was prepared in accordance with Example I above and contained about 1% sodium bentonite. The sodium contents of these catalysts were not significantly different (about 0.5% $Na_2O$). Prior to testing, catalyst B was treated at 1400° F. for 10 hours in 20% steam-80% air, and catalyst C was treated at 1525° F. for two hours with 20% steam in air. All three catalysts were employed in dehydrogenation of a butane feed under identical conditions: 1100° F., hydrocarbon space rate of 1 (vol./hr./vol.), pressure of 5 inches mercury absolute, for an on-stream period of 10 minutes. The results are reported in Table 1 below.

Each of the above catalysts was then subjected to accelerated aging by steam treatment at 1600 F. for 2 hours in 20% steam to simulate the expected effect on the catalyst in about 5 months of actual operation in use. The characteristics of the aged catalyst are also compared in the table.

Table 1

| | Initial Catalysts | | | Aged Catalysts | | |
|---|---|---|---|---|---|---|
| | A | B | C | A | B | C |
| Conversion (wt. percent) | 77 | 69 | 75 | 67 | 52 | 69 |
| Coke Factor [a] | 1.0 | 1.0 | 1.0 | 8.2 | 2.7 | 1.5 |
| Butenes (wt. percent) | 42 | 41 | 43 | 25 | 26 | 41 |
| Butadiene (wt. percent) | 18 | 15 | 17 | 9 | 12 | 15 |
| Area (m.²/g.) | 56 | 56 | 64 | 19 | 24 | 54 |
| $\alpha Al_2O_3$ (wt. percent) | 0 | 0 | 0 | 70 | 65 | 0 |

[a] Ratio of coke obtained to that for fresh catalyst B as a standard at the same conversion level.

It will be seen from the above table that while the three catalysts start out having activity and selectivity which are not too significantly distinguished, catalyst C is eminently superior from the standpoint of aging characteristics. Because of the high coke factor (8-fold increase!) of the A catalyst, its depreciated selectivity for desired olefins and diolefins, further evidenced by its comparatively low surface area and high alpha alumina content, this catalyst has exceeded the limit of its practical usefulness. Catalyst B has depreciated to a lesser extent but to such level that in practical use replacement with fresh catalyst would ordinarily be considered advisable from the standpoint of the economics involved. Catalyst C, on the other hand, still shows an acceptable coke level and high selectivity which would warrant its further continued use for a considerable period, which period can be estimated at about an additional five months or more based on the comparison of its properties with those of catalyst B in the initial (unaged) condition of the latter catalyst.

For the purpose of further comparison, commercial catalyst B was modified by including in its manufacture 1% Volclay instead of the previous 0.5%. Such increase in the amount of stabilizer alone did not obtain the desired protection of the catalyst against loss of area nor against the conversion of the support to alpha alumina; moreover, the activity of this catalyst, after 1600° F. steam treatment was considerably lower than that of the high-area impregnated catalyst of Example I.

Figure 2:
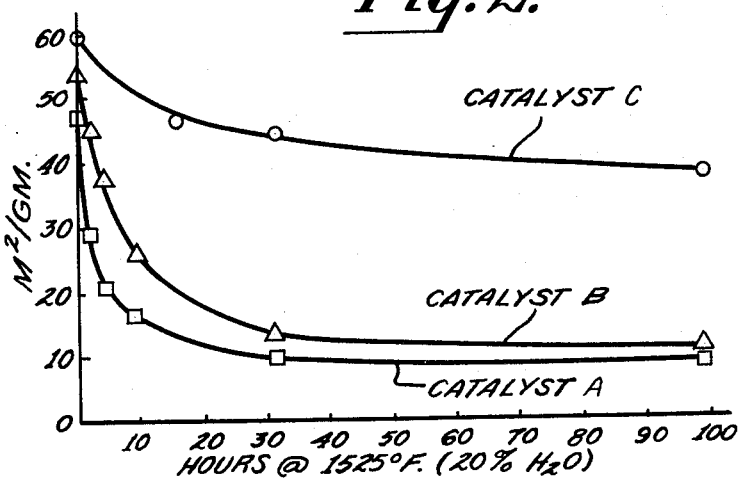

The area stability of the catalysts of the invention was further demonstrated by prolonged steaming respectively at 1600° F. and at 1525° F. (20% steam); which are indicative of the expected rate of decline in area of the catalyst in use. Figure 1 shows effects of steaming at 1600° F. in a period of 16 hours; Figure 2 shows effects of steaming at 1525° F. over a period of 100 hours. The results obtained with catalysts according to the invention are compared in each instance with principal commercial catalysts of this type. Thus, Figure 1 shows the extent of loss in area of each of the catalysts on continued steaming under the specified conditions. Catalyst C, it will be observed, well retains moderate area (about 40 m.²/g.) even after sixteen hours steaming, while catalysts A and B have been reduced to 20 square meters per gram or lower in 2 hours and 4 hours, respectively. As seen from Figure 2, at 1525° F. steaming catalysts A and B are reduced to below 20 m.²/g. area in 5 to 15 hours respectively, while catalyst C has an area of about 40 m.²/g. at the end of 100 hours' steam treatment. It has been observed from previous experience in commercial dehydrogenation units, that when the catalysts decline in surface area to about the level of 20 square meters per gram, there is an accompanying loss in activity and selectivity to such extent that further use of the catalyst is not economically desirable.

EXAMPLE II

Another batch of high area alumina catalyst pellets was prepared in the manner substantially similar to that described in Example I above. The finished catalyst contained 1% sodium bentonite (Volclay) by weight of the $Al_2O_3$, about 0.4% $Na_2O$, and approximately 20%

$Cr_2O_3$ (on $Cr_2O_3$—$Al_2O_3$ basis). After steam treatment for two hours at 1200° F. in a mixture of 80% air and 20% steam, the catalyst had a surface area (measured by nitrogen) of 98 square meters per gram.

The catalyst in this form was employed in a fixed bed adiabatic dehydrogenation unit admixed with fused alumina as inert heat capacity material in the ratio of 60 volumes catalyst per 40 inert, to determine the initial catalytic properties of the fresh catalyst. At the conclusion of a number of runs on the catalyst with periodic regeneration the surface area of the catalyst was reduced to 77 square meters per gram. The regenerated catalyst was then given a further steam treatment at 1400° F. for eight hours in 20% steam-air mixture which reduced the surface area further to 65 square meters per gram. In this condition the catalyst (designated D in Table 2 below) was again used in dehydrogenation of an n-butane feed and of a feed containing about 65% butane and 35% butenes, the results of which are reported in Table 2 below.

After a number of runs on the several feeds described above with intermediate regeneration between runs, the catalyst in regenerated condition was given a further steam treatment at 1600° F. for the equivalent of 2 hours in 20% steam-air mixture. The catalyst was then again used in this condition (designated catalyst E in Table 2 below) for dehydrogenation of a butane feed and of a mixed feed containing butenes, with the results tabulated in Table 2 below.

In order that catalyst of this high unit activity can be used under practical conditions of designed commercial operations, it is extremely important that the coking tendency of such catalyst be reduced as far as feasible without undue sacrifice of unit activity or surface area. This is accomplished by controlling the alkali metal content of the catalyst within the limits hereinbefore described.

Obviously many modifications and variations of the invention as hereinbefore set forth may be made without departing from the spirit and scope thereof, and therefore only such limitations should be imposed as are indicated in the appended claims.

What is claimed is:

1. The method of preparing chrome-alumina catalyst which comprises incorporating sodium bentonite in an alumina trihydrate in an amount to furnish 0.5 to 3.0% of the bentonite by weight of $Al_2O_3$, extruding said mix to form pellets, heat treating said pellets for a time and at a temperature of at least 800° F. to effect partial dehydration without lowering the surface area thereof below 120 square meters per gram, impregnating such pellets after cooling the same with a cool solution of $CrO_3$ in an amount to incorporate therein about 20% $Cr_2O_3$ by weight of the pellets, and heat treating the pellets in the presence of steam at higher temperature than said prior heat treatment to reduce the surface area thereof to below 100 square meters per gram.

2. The method of preparing chrome-alumina catalyst

*Table 2*

| Catalyst | D | | E | | B | |
|---|---|---|---|---|---|---|
| Steam Treat, hrs./° F | 1. 2/1,200 + 2. 8/1,400 | | 1 and 2. (Col. D) + 2/1,600 | | 7/1,400 | |
| Surface Area, m.²/g | 65 | | 54 | | 56 | |
| Yields—Butane Runs: | | | | | | |
| Butadiene, wt. percent feed | 10.9 | | 12.6 | | 9.1 | |
| Butenes, wt. percent feed | 36.8 | | 35.0 | | 31.9 | |
| Butadiene Selec., wt. percent | 17.5 | | 20.5 | | 17.8 | |
| | (a) | (b) | (a) | (b) | (a) | (b) |
| Yields—Mixed Feed Runs (35-37% butenes in feed): | | | | | | |
| @1,100° F. bed outlet temp.— | | | | | | |
| Butadiene, wt. percent feed | 12.8 | 12.4 | 13.2 | 13.3 | 11.6 | 12.6 |
| Butadiene Selec., wt. percent | 57.6 | 62.5 | 62.3 | 62.0 | 61.2 | 61.9 |
| @10% constant buta. yield— | | | | | | |
| Butadiene, wt. percent feed | 10 | | 10 | | 10 | |
| Butadiene Selec., wt. percent | 59.0 | | 63.5 | | 62.0 | |
| @14% constant buta. yield— | | | | | | |
| Butadiene, wt. percent feed | 14 | 14 | 14 | 14 | 14 | 14 |
| Butadiene Selec., wt. percent | 55.5 | 61.8 | 61.7 | 61.8 | 60.5 | 60.6 |

| | Operating Conditions | | |
|---|---|---|---|
| | Butane Runs | Mixed Feed Runs | |
| | | (a) | (b) |
| Bed Outlet, Initial Temp., ° F | 1,100 | as indicated | as indicated. |
| Bed Loading, vol. percent catalyst | 60 | 60 | 36. |
| Space Rate, v./hr./v. cat | 1.3 | 2.1-2.2 | 2.1-2.2. |
| Pressure, in. Hg abs | 7 | 7 | 7. |

From the foregoing tabulations it is apparent that catalysts prepared in accordance with the invention by chrome impregnation of the stabilized alumina base of high area (catalysts D and E above) display important advantages over present commercial catalyst of substantially analogous composition (catalyst B). While the tabulation indicates the superiority of catalyst E in that the more outstanding results at all operating conditions tested were obtained with that catalyst which had been steam treated to an area of 54 square meters per gram, it should be noted that catalyst D will be exposed to conditions in use such as to achieve the lower surface area of catalyst E with expected ultimate attainment of similar properties.

The extremely high unit activity of catalyst D is ordinarily accompanied by relatively high coke production.

which comprises incorporating sodium bentonite in an alumina trihydrate in an amount to furnish 0.5 to 3.0% of the bentonite by weight of $Al_2O_3$, preparing a mix consisting essentially of alumina, water, and said 0.5 to 3% sodium bentonite, extruding said mix to form pellets, heat treating said pellets for at least one hour at at least 800° F. to effect partial deyhydration without lowering the surface area thereof below 120 square meters per gram, impregnating such pellets after cooling the same with a cool solution of $CrO_3$ in an amount to incorporate therein about 20% $Cr_2O_3$ by weight of the pellets, and heat treating the pellets in the presence of about 20% steam at a temperature of about 1200° F. to reduce the surface area thereof to below 100 square meters per gram.

(References on following page)

References Cited in the file of this patent

UNITED STATES PATENTS

| | | |
|---|---|---|
| 1,442,413 | Olsson | Jan. 18, 1923 |
| 2,399,678 | Houdry et al. | May 7, 1946 |
| 2,408,207 | Garrison | Sept. 24, 1946 |
| 2,410,436 | Ewing | Nov. 5, 1946 |
| 2,418,270 | Matuszak | Apr. 1, 1947 |
| 2,489,333 | Shabaker | Nov. 29, 1949 |
| 2,499,675 | Owen | Mar. 7, 1950 |
| 2,551,580 | Bond | May 8, 1951 |
| 2,759,899 | Hanson | Aug. 21, 1956 |